(12) United States Patent
Keeter

(10) Patent No.: US 6,672,041 B1
(45) Date of Patent: Jan. 6, 2004

(54) SCRAPPING PLATE ASSEMBLY FOR COTTON HARVESTER

(76) Inventor: Alton Ray Keeter, 177 Ark La., Scotland Neck, NC (US) 27874

( * ) Notice: Subject to any disclaimer, the term of this patent is extended or adjusted under 35 U.S.C. 154(b) by 0 days.

(21) Appl. No.: 10/389,602

(22) Filed: Mar. 17, 2003

(51) Int. Cl.$^7$ ................................................ A01D 46/18
(52) U.S. Cl. ................................................ 56/41; 56/50
(58) Field of Search ................................ 56/28–50, 12.1

(56) References Cited

U.S. PATENT DOCUMENTS 3,528,232 A * 9/1970 Fachini ........................... 56/44
6,293,078 B1 * 9/2001 Deutsch et al. ................. 56/44
6,591,597 B1 * 7/2003 Stueck et al. ................... 56/41

* cited by examiner

*Primary Examiner*—Robert E. Pezzuto
*Assistant Examiner*—Meredith Petravick

(57) ABSTRACT

A scrapping plate assembly for cotton harvesters includes a series of elongated trapezoidal ribs on the pressure plate defining separate paths for each picker spindle and providing an increased zone for compressively engaging the cotton bolls and extending the contact zone with the spindle barbs thereby increasing removal of bolls from the plant stalks and reducing dropage.

10 Claims, 6 Drawing Sheets

US 6,672,041 B1

SCRAPPING PLATE ASSEMBLY FOR COTTON HARVESTER

FIELD OF THE INVENTION

The present invention relates to cotton harvesters and, in particular, to a scrapping plate assembly for a cotton harvester row unit.

BACKGROUND OF THE INVENTION

Cotton harvesting has always been economically sensitive. When productivity increases were necessary to meet demand, manual picking was replaced by machinery. Though requiring less labor content, the machinery was capital intensive and less efficient in harvesting the available crop, failing to pick immature cotton bolls and dropping to the ground otherwise utile product. Gains were made in production speed and harvest efficiency as multi-row harvesters became available. Notwithstanding these improvements, to remain competitive in cost and supply, dual pass harvesting was employed to reap the cotton missed in the first harvest.

As the cotton sector evolves, smaller tracts of land are being supplanted by large fields, typically 1,000 acres or more. When all the costs and times associated with the larger fields have been considered, it is generally deemed uneconomical to conduct multiple pass harvesting, and the dropage and incomplete harvesting considered inescapable yield losses. Experience has shown that as much as 10% to 15% of the cotton lint remains on the stalks or on the ground after a single harvesting path.

Accessories such as scrapping plates have been employed for increasing efficiencies, but have not been considered acceptable for initial harvesting particularly for heavy cotton or use with short knotty cotton. These scrapping plates carried on the pressure plates are used in conjunction with spindle-type pickers, such as the John Deere 9965 series and as disclosed in U.S. Pat. Nos. 5,203,152 to Deutsch et al.; U.S. Pat. No. 5,519,988 to Copley; U.S. Pat. No. 5,557,910 to Del Rosario; U.S. Pat. No. 6,293,078 to Deutsch el al.; and U.S. Pat. No. Re. 32,699 to Fachini. Therein, vertical rows of rotating spindles carried on an orbiting drum engage the cotton bolls with pointed barbs, carry the entangled cotton between grid bars to doffer columns whereat the cotton is removed from the spindles and discharged to a vacuum conveyor system for delivery to the storage container. The scrapping plates have projecting triangular ribs that coact with alternate spindles to compressively force the cotton through the passage therebetween, engaging and capturing bolls that would otherwise not be harvested. The contact path is relatively short, about 3 inches, and shallow, about 1 inch, such that only about two barbs contact the compressed boll thereby limiting engagement with the result that cotton bolls may drop to the ground or be dislodged by the grid bars.

In view of the foregoing, it would be desirable to provide a cotton harvester adjunct for use in single pass cotton harvesting to provide increased yields through reduction in dropage and an increase in stalk picking.

SUMMARY OF THE INVENTION

The foregoing is accomplished in the present invention by a scrapping plate assembly that employs elongated tapered ribs adjacent each passing spindle to increase the contact path while the cotton in a compacted condition thereby increasing barb engagement and contact time with the spindle, increasing harvesting from the stalks and reducing dropage. The scrapping plate assembly includes a base plate, fixed at existing mounting holes on the rear of the row unit pressure plate, and carrying a plurality of elongated ribs providing independent parallel paths for each spindle. The ribs have a tapered entry section for progressively engaging the product, a center section for engaging multiple barbs with the product over a substantial distance and height, and a tapered exit section extending beyond the pressure plate and gradually reducing contact with the product adjacent the grid bars. The scrapping plate assembly markedly increases the cotton removed from the stalks in a single pass and decreases the product lost through dropage.

Accordingly, it is an object of the present invention to provide an accessory for increasing the cotton harvesting on a row unit cotton harvester.

Another object of the invention is to provide an improved scrapping plate yielding an improved cotton removal and retrieval in a single harvesting operation.

A further object of the invention is to provide a scrapping assembly for a cotton harvester row unit that increases the capture of cotton by the picker spindles.

DESCRIPTION OF THE DRAWINGS

The above and other objects and advantages of the present invention will become apparent upon reading the following written description taken in conjunction with the accompanying drawings in which.

DETAILED DESCRIPTION OF THE PREFERRED EMBODIMENT

Figure 1:
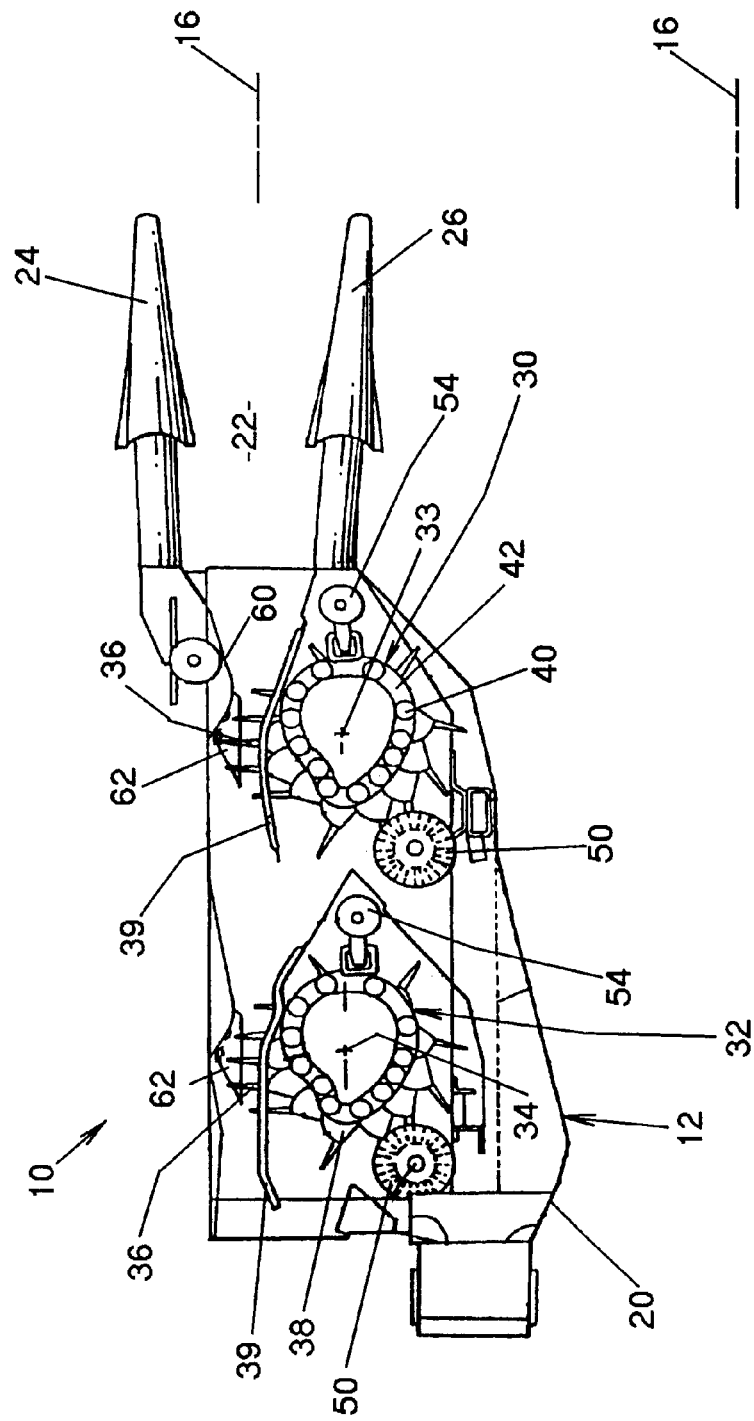
FIG. 1 is a top view of a row unit for a cotton harvester provided with a scrapping plate assembly in accordance with a preferred embodiment of the invention.

Referring to the drawings for the purpose of illustrating a preferred embodiment of the invention and not for limiting same, FIG. 1 shows a cotton harvester 10 having transversely spaced row units 12, a single unit being representatively shown. Each row unit 12 is conventionally mounted on a support structure and a tractor for forward movement over a field to harvest parallel rows 16 of cotton plants. A suitable harvester for the present invention is the John Deere 9965 Cotton Picker.

Each row unit 12 includes a housing 20 having a row receiving area 22 between left and right stalk lifters 24, 26. Front and rear picker drums 30, 32 are longitudinally disposed about vertical rotational axes 33, 34. A plurality of spindles 36 are supported on the drums by picker bars 38 and mutually separated by horizontal grid bars 39.

The picker drums 30, 32 include a cam arm and roller 40 supported in a cam track 42 for determining the spindle position during orbiting on the track. Doffer columns 50 are rotationally supported on vertical axes downstream of the respective picker drums for doffing cotton from the spindles 36. Moistener columns 54 are supported at the front of the picker drums 30, 32 for wiping the spindles 36 after doffing of the cotton therefrom.

Adjustable vertically disposed pressure plates 60 are carried by the structure of the row unit opposite and slightly upstream of the picker drums. A scrapping plate assembly 62 is carried on the pressure plate 60 and is longitudinally traversed by the spindles 36, as illustrated, during counter-clockwise movement along the track 42. During movement through the scrapping plate assembly 62, additional cotton bolls, not securely initially gripped by the barbs of the spindles, are forced into extended affirmative contact, thereby increasing the amount of cotton engaged by the spindle barbs, passed between the grid bars 39, and presented to the doffer columns 50 for removal.

Figure 6:
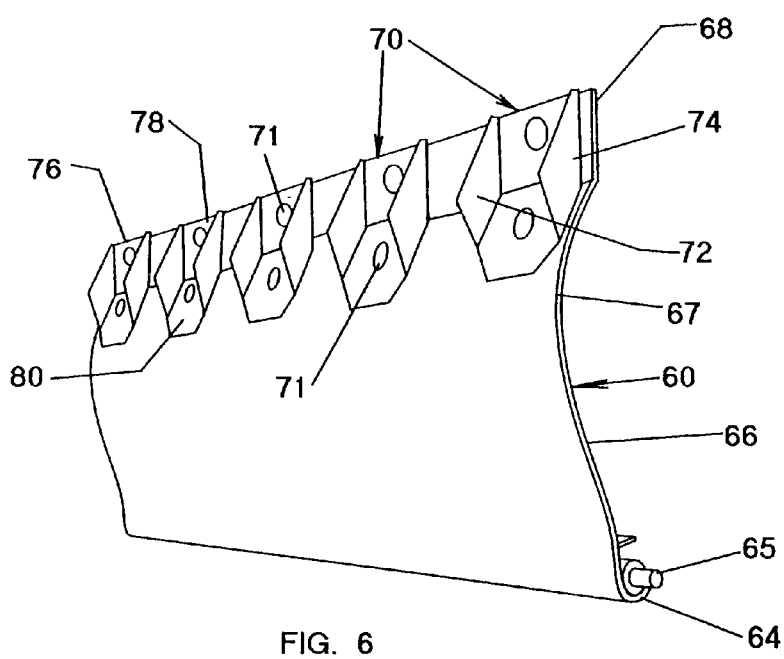
FIG. 6 is a perspective view of a prior art scrapping plates mounted on a pressure plate.
Figure 5:
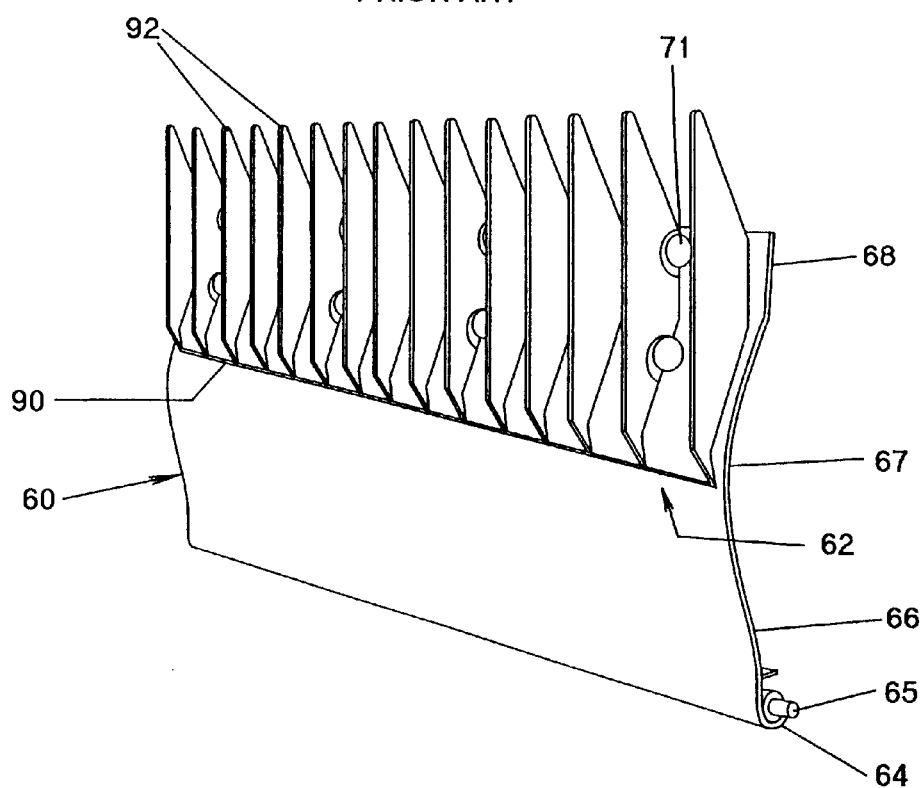
FIG. 5 is a perspective view of the scrapping plate assembly and pressure plate.

The scrapping plate assembly 62 is illustrated in FIG. 5. A prior art scraping plate configuration is illustrated in FIG. 6. Each version is mounted on a conventional pressure plate 60. The pressure plate 60 includes a leading end 64 including a shaft 65 for conventional adjustable pivotal mounting on the row unit support structure, a curvilinear center section 66 having a curved crest 67, and a rectangular slightly included planar end strip 68.

Referring to the prior art arrangement of FIG. 6, a plurality of scrapping plates 70 are attached by fasteners 71 at vertically spaced locations along the trailing end of the pressure plate 60 at a plurality of spaced holes in the center section 66 and end strip 68. The scrapping plates 70 are generally U-shaped having planar horizontally extending triangular ribs 72, 74 interconnected by a bent base 76. The base 76 includes a front section 78 at the rear of the center section 66, and a rear section 80 at the end strip 68. In operation, a pair of spindles traverse each groove between the ribs. In other words, one spindle passes between the fasteners 71 and rib 72, and another spindle passes between the fasteners 71 and the rib 74. The next pair of spindles pass between adjacent ribs. All spindles rotate in a common direction. Accordingly, as a spindle traverses the path illustrated in the dashed lines in FIG. 4, the smaller cotton bolls will be wedged between the spindle and the adjacent rib during the transit time resulting in additional barbs penetrating the boll wall and entangling the fibers. If sufficient pick up is attained the cotton will remain on the spindle and pass between the grid bars 39 for removal at the doffer columns 50, and resultant harvesting. Experience has revealed that secure retention is problematic and cotton drops to the ground, or dislodged at the grid bars. Moreover the second spindle of the pair does not benefit from the other rib interface inasmuch as the relative rotation tends to dislodge any gripping at the barbs against the trailing edge of the rib, generally resulting in dropage and/or non-harvesting.

Figure 2:
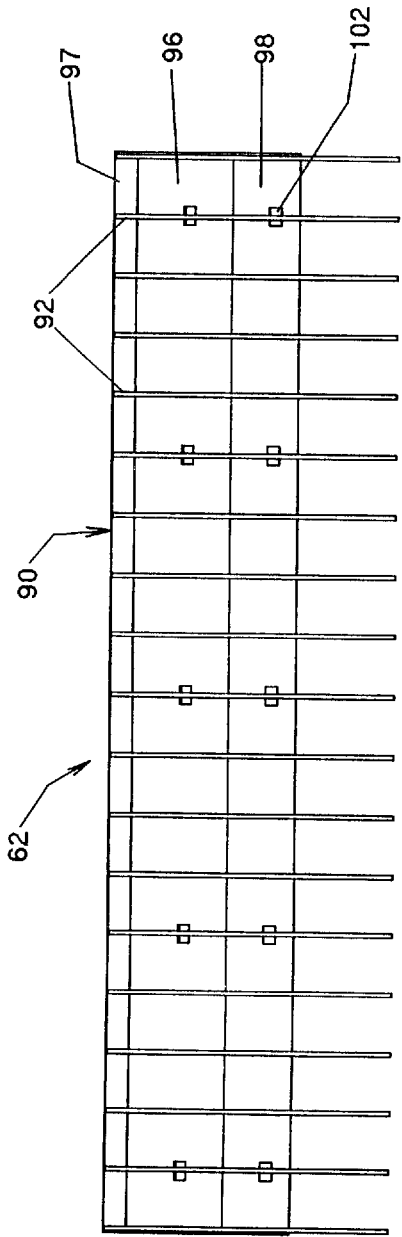
FIG. 2 is a top view of the scrapping plate assembly.
Figure 3:
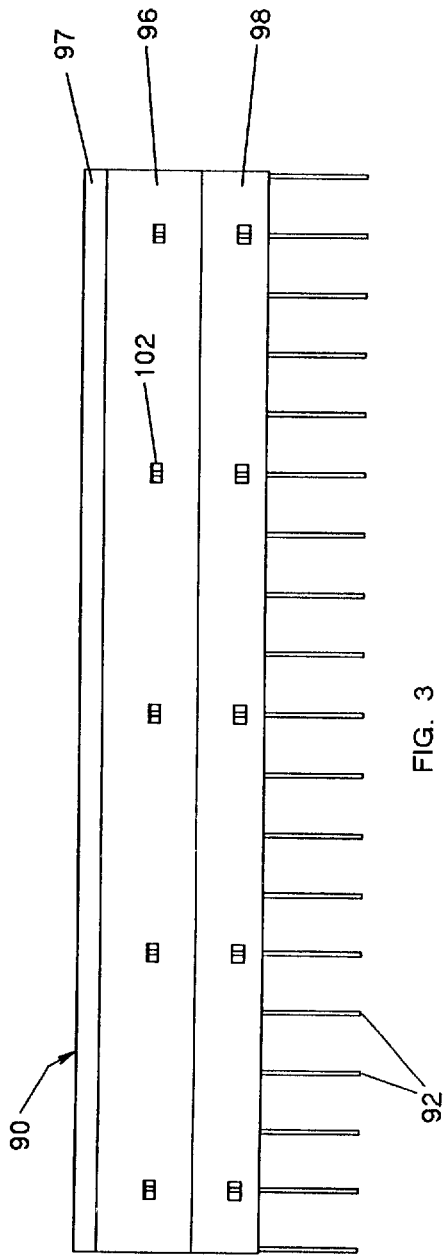
FIG. 3 is a bottom view of the scrapping plate assembly.
Figure 4:
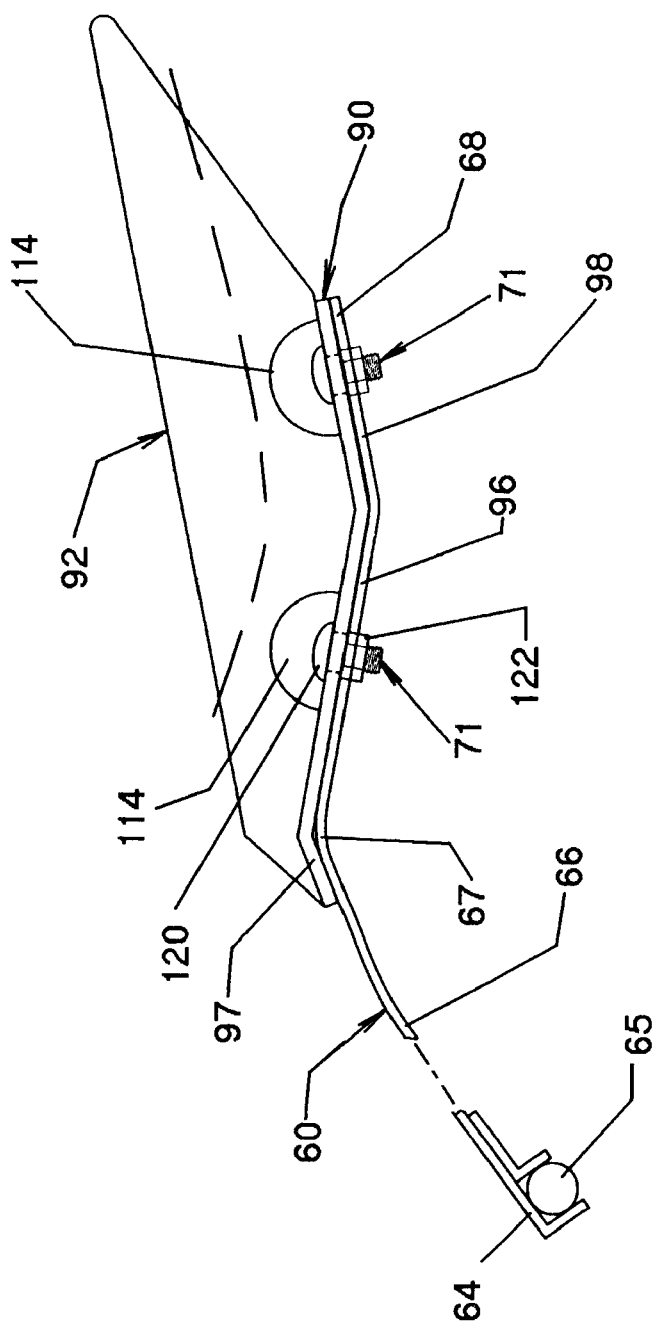
FIG. 4 is a side view of the scrapping plate assembly of FIG. 1 mounted on a pressure plate of the row unit and indicating the spindle path in dashed lines.

The harvesting rate is increased and the dropage rate reduced by the scrapping plate assembly 62 of the present invention as shown in FIGS. 2 through 4. Therein, the scrapping plate assembly 62 comprises a base plate 90 carrying a plurality of uniformly spaced, transversely extending ribs 92 defining therebetween spindle paths for a single spindle. The ribs 92 comprise a first set corresponding in vertical location to the ribs 72, 74 of the above mentioned prior art construction of FIG. 5, and a second set interspaced therebetween and overlying the fasteners 71.

Figure 7:
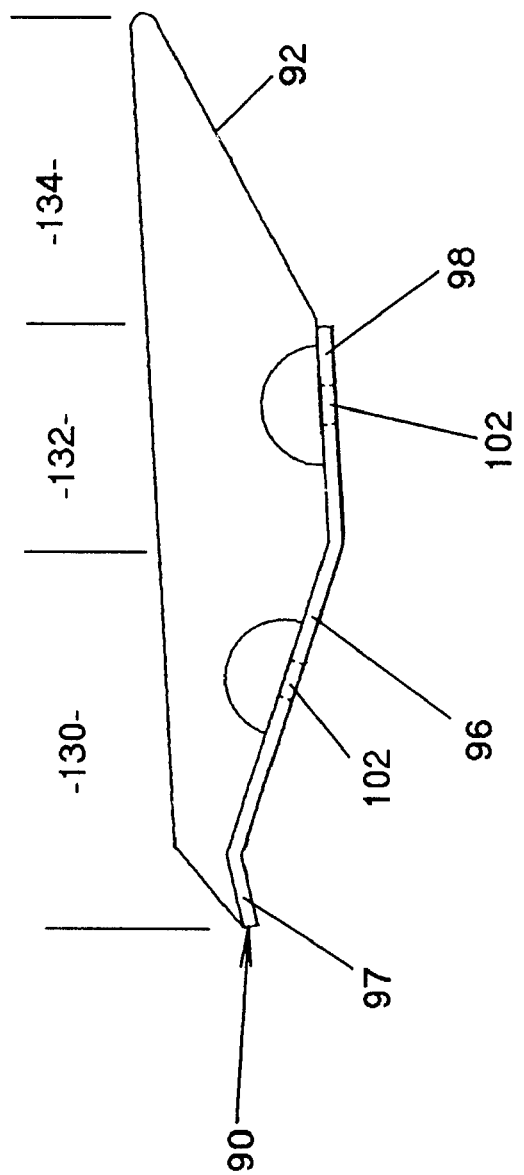
FIG. 7 is a side elevational view of the scrapping plate assembly.

Referring to FIG. 7, the base plate 90 includes a front section 96 terminating with a downwardly inclined lip 97, and a rear section 98. The front section 96 and rear section 98 are relatively inclined at a shallow angle of about 26° conforming to the transition angle between the center section 66 and rear strip 68 of the pressure plate 60. The lip 97 overlies the crest 67 of the center section of the pressure plate 60, having an include angle of about 135° with respect to the front section to provide a conforming fit thereat. The rear section 98 overlies the rear strip 68. The sections 96, 98 include a series of square holes 102 aligned with the corresponding holes in the pressure plate 60. It will be appreciated, accordingly, that the base plate 90 spans a substantially longer length than the prior art scrapping plate.

Figure 8:
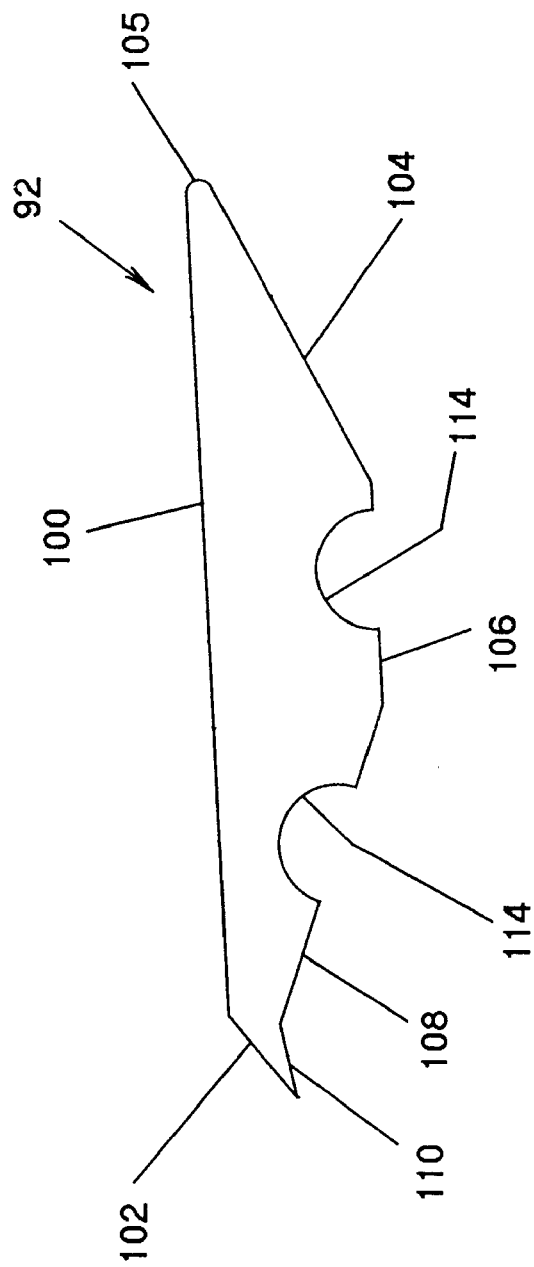
FIG. 8 is a side view of the ribs of the scrapping plate assembly.

Referring to FIG. 8, the ribs 92 are a parallel array of generally inverted trapezoids thin plates welded to the base plate 90. The ribs are formed of heavy gage plate, a thickness of about 1/8 to 3/16 inch being preferred. Each rib 92 is vertically defined by an upper wall 100 and a bottom wall 106 parallel thereto. The rib has a height of about 1.5 inches. The upper wall 100 frontally terminates with a nose wall 102 inclined downwardly with respect thereto at a shallow angle of about 24°. The upper wall 100 rearwardly terminates with a reversely inclined exit wall 104 including a rounded tip 105. The included angle between the upper wall 100 and the exit wall is about 30°. The exit wall 104 merges the bottom wall 106. In assembly, the bottom wall 106 engages the rear strip 98 and extends substantially rearwardly therebeyond. A transition wall 108 extends upwardly from the front of the base wall 106 and intersects a downwardly inclined wall 110 frontally merging with the wall 102. The walls 106 and 108 are welded to the walls 96, 98. Downwardly opening semi-circular slots 114 are formed in the ribs 92 registering with the holes 102 in the base plate 90. In assembly, as shown in FIG. 4, the slots 114 allow the bolt 120 of the fasteners 71 to be inserted through the aligned openings and assembled with nut 122 to fixedly connect the scrapping plate assembly 62 to the pressure plate 60.

Referring to FIG. 7, the ribs 92 present an entry section 130 of progressively increasing height, a center section 132 of relatively constant height, and a tail section 134 of progressively decreasing height. In operation, the cotton bolls will be preliminarily engaged by the spindle in the entry section 130, increasingly entangled in the center section 132 and progressively released in the entangled state at the tail section 134 for passage between the grid bars 39, thereby avoid any dropping or stripping at the grid bars and resulting in substantially improved yield. Further, all spindle traverse a similar scrapping path further increasing production. Tests to date have indicated that upwards of 6% to 10% more cotton lint are harvested with the present scrapping plate assembly in comparison to prior approaches, with or without scrapping plates.

Alternative to the accessory mounting of the ribs 92 is will be appreciated the benefits of the invention may be directly incorporated in the manufacture of the pressure plate or equivalent structure to thereby provide independent bounded paths for the spindles to compressively engage the cotton product passing therethrough.

Having thus described a presently preferred embodiment of the present invention, it will now be appreciated that the objects of the invention have been fully achieved, and it will be understood by those skilled in the art that many changes in construction and widely differing embodiments and applications of the invention will suggest themselves without departing from the sprit and scope of the present invention. The disclosures and description herein are intended to be illustrative and are not in any sense limiting of the invention, which is defined solely in accordance with the following claims.

What is claimed:

1. In a cotton harvester having a row unit for traversing rows of cotton plants in a field wherein the row unit includes picker drum units having a plurality of rotating, vertically spaced horizontally disposed spindles, said spindles having projecting barbs for engaging cotton boles on the plants movable in closed paths opposite a vertical deflecting plate defining a longitudinal path for routing the plants therethrough, a scrapping plate assembly for increasing the harvest of cotton from said plants comprising: a base member fixed to the deflecting plate opposite said spindles; a vertical array of uniformly spaced horizontally projecting elongated rib members fixed to said base member and defining therebetween separate horizontal longitudinally extending slots for each of said spindles in movement in said closed paths, said rib members having a tapered entry end at the front end of said slots and a tapered exit end at the rear end of said slots and projecting rearwardly beyond the deflecting plate whereby cotton traversing said slots are compressively engaged between the spindles and said rib members throughout the length of said slots for increasing contact between the cotton products and the barbs of said spindles thereby providing retention of the cotton thereon.

2. The scrapping plate assembly as recited in claim 1 wherein said rib members have a planar top wall.

3. The scrapping plate assembly as recited in claim 2 wherein said tapered entry end is generally triangular and defined by said top wall and a wall reversely inclined thereto and merging with said rear end of said base member at a shallow angle.

4. The scrapping plate assembly as recited in claim 1 wherein said deflecting member has a series of holes therein aligned in assembly with alternate rib members, and said base members includes openings aligned with said holes and said rib members have downwardly opening slots adjacent said holes for receiving fastener means for connecting said base member to said deflecting member.

5. A pressure plate for a cotton harvester having a row unit for traversing rows of cotton plants in a field wherein the row unit includes picker drum units having a plurality of rotating, vertically spaced horizontally disposed spindles, said spindles having projecting barbs for engaging cotton boles on the plants movable in closed paths in juxtaposition to the pressure plate, said pressure plate comprising; a plate member terminating with a trailing end including a front section and a rear section inclined with respect thereto at a shallow angle; a plurality of ribs arranged in a parallel array transverse to said front section and said rear section and normal to said plate member, said ribs defining therebetween separate horizontal longitudinally extending slots for each of said spindles in movement in said closed paths, said rib having a tapered entry end engaging said front section at the front end of said slots, a center section engaging said rear section, and a tapered exit end at the rear end of said slots and projecting rearwardly beyond the pressure plate, whereby cotton traversing said slots are compressively engaged between the spindles and said ribs throughout the length of said slots for increasing cotton retention on the spindles.

6. The pressure plate as recited in claim 5 wherein said entry end is generally triangular.

7. The pressure plate as recited in claim 6 wherein said exit end is generally triangular.

8. The pressure plate as recited in claim 7 wherein said center section has a constant height.

9. The pressure plate as recited in claim 8 wherein said ribs have a planar top wall parallel to said rear section of said pressure plate.

10. The pressure plate as recited in claim 9 wherein said exit end is defined by the rear portion of said top wall and a trailing wall extending from the end thereof to the end of said rear section.

* * * * *